United States Patent
Wang et al.

(10) Patent No.: US 11,797,001 B1
(45) Date of Patent: Oct. 24, 2023

(54) METHOD FOR TRANSFERRING CONTROL TO AN OPERATOR

(71) Applicant: Direct Current Capital LLC, Wilmington, DE (US)

(72) Inventors: Tao Wang, Mountain View, CA (US); Wei Song, Mountain View, CA (US)

(*) Notice: Subject to any disclaimer, the term of this patent is extended or adjusted under 35 U.S.C. 154(b) by 0 days.

(21) Appl. No.: 17/327,362

(22) Filed: May 21, 2021

Related U.S. Application Data

(63) Continuation of application No. 16/943,969, filed on Jul. 30, 2020, now Pat. No. 11,131,990, which is a continuation of application No. 16/206,477, filed on Nov. 30, 2018, now abandoned.

(60) Provisional application No. 62/592,806, filed on Nov. 30, 2017.

(51) Int. Cl.
*G05D 1/00* (2006.01)

(52) U.S. Cl.
CPC ......... *G05D 1/0061* (2013.01); *G05D 1/0027* (2013.01); *G05D 1/0038* (2013.01); *G05D 1/0088* (2013.01); *G05D 2201/0213* (2013.01)

(58) Field of Classification Search
CPC .. G05D 1/0061; G05D 1/0027; G05D 1/0038; G05D 1/0088; G05D 2201/0213
See application file for complete search history.

(56) References Cited

U.S. PATENT DOCUMENTS

| | | | |
|---|---|---|---|
| 9,688,288 B1* | 6/2017 | Lathrop | G05D 1/0061 |
| 10,185,327 B1 | 1/2019 | Konrardy et al. | |
| 2016/0026180 A1* | 1/2016 | Tsimhoni | G06Q 50/00 701/23 |
| 2017/0315551 A1* | 11/2017 | Mimura | B60W 50/08 |
| 2017/0357361 A1* | 12/2017 | Hong | G05D 1/021 |
| 2018/0023966 A1* | 1/2018 | Iwai | G08G 1/0112 701/423 |
| 2018/0052463 A1 | 2/2018 | Mays | |
| 2018/0072313 A1 | 3/2018 | Stenneth | |
| 2018/0203455 A1 | 7/2018 | Cronin | |
| 2018/0284759 A1 | 10/2018 | Michalakis et al. | |
| 2019/0049949 A1 | 2/2019 | Patel et al. | |
| 2019/0163176 A1 | 5/2019 | Wang et al. | |
| 2019/0322291 A1 | 10/2019 | Tsuda | |

* cited by examiner

*Primary Examiner* — Rodney A Butler
(74) *Attorney, Agent, or Firm* — Polsinelli PC

(57) ABSTRACT

Control of a mobile device is transferred to and from an operator. In one aspect, a specification for triggering manual control of the mobile device is accessed. A location is identified within a geographic region that exhibits characteristics defined by the specification. The location is represented in a navigation map and is associated with an operator trigger. As the mobile device approaches the location, a request for manual control is provided to the operator based on the operator trigger, and manual control is initiated.

20 Claims, 6 Drawing Sheets

METHOD FOR TRANSFERRING CONTROL TO AN OPERATOR

CROSS-REFERENCE TO RELATED APPLICATIONS

The present application is a continuation of U.S. patent application Ser. No. 16/943,969, filed on Jul. 30, 2020, which is a continuation of U.S. patent application Ser. No. 16/206,477, filed on Nov. 30, 2018, which claims the benefit of U.S. Provisional Application No. 62/592,806, filed on Nov. 30, 2017. Each of these applications is incorporated by reference in its entirety herein.

TECHNICAL FIELD

The presently disclosed technology relates generally to the transfer of control of a mobile device to an operator and more specifically to transferring control to an operator based on a frequency of operation transitions at a particular geographic location.

DETAILED DESCRIPTION

Figure 1:
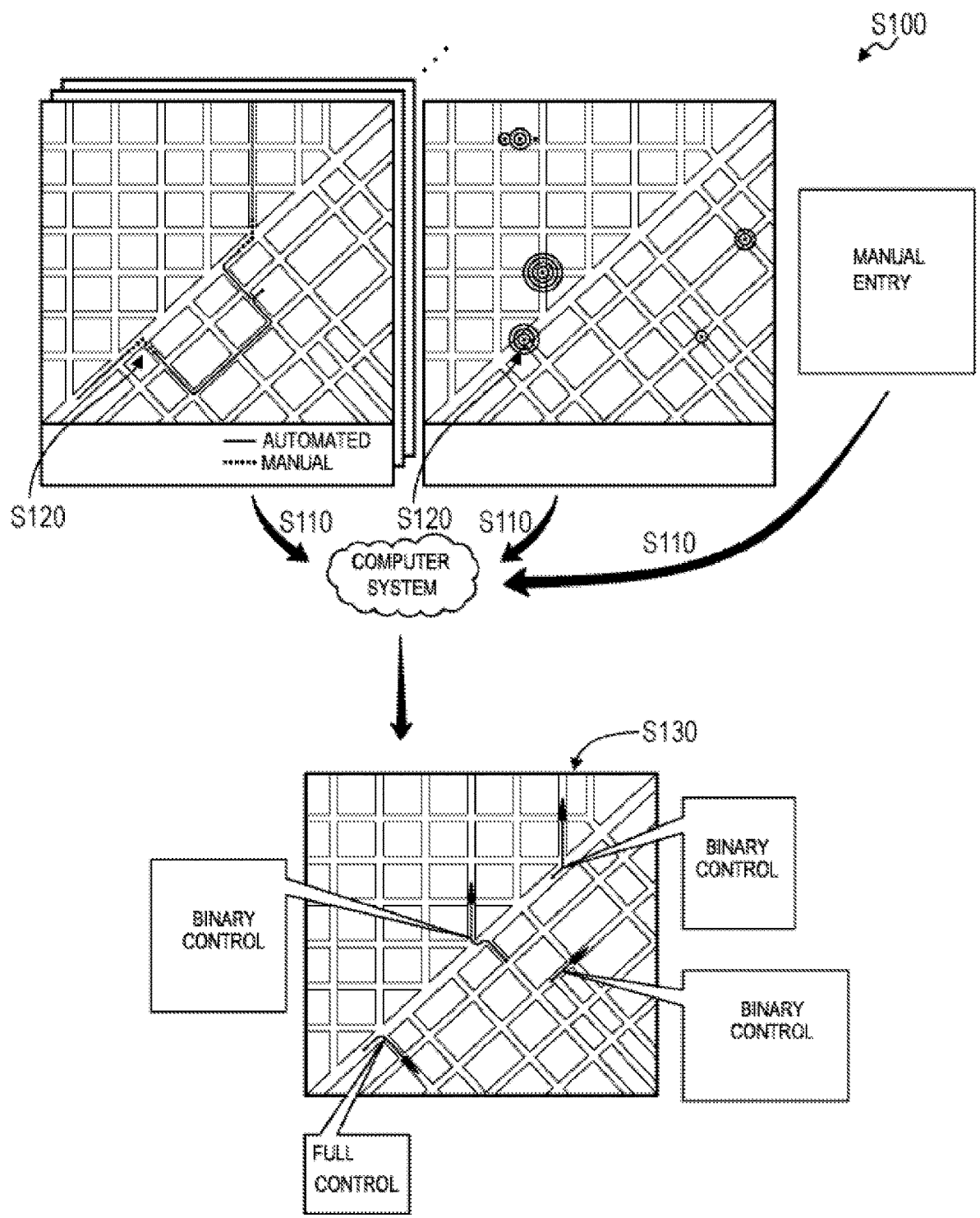
FIG. 1 is a flowchart representation of a method.
Figure 2:
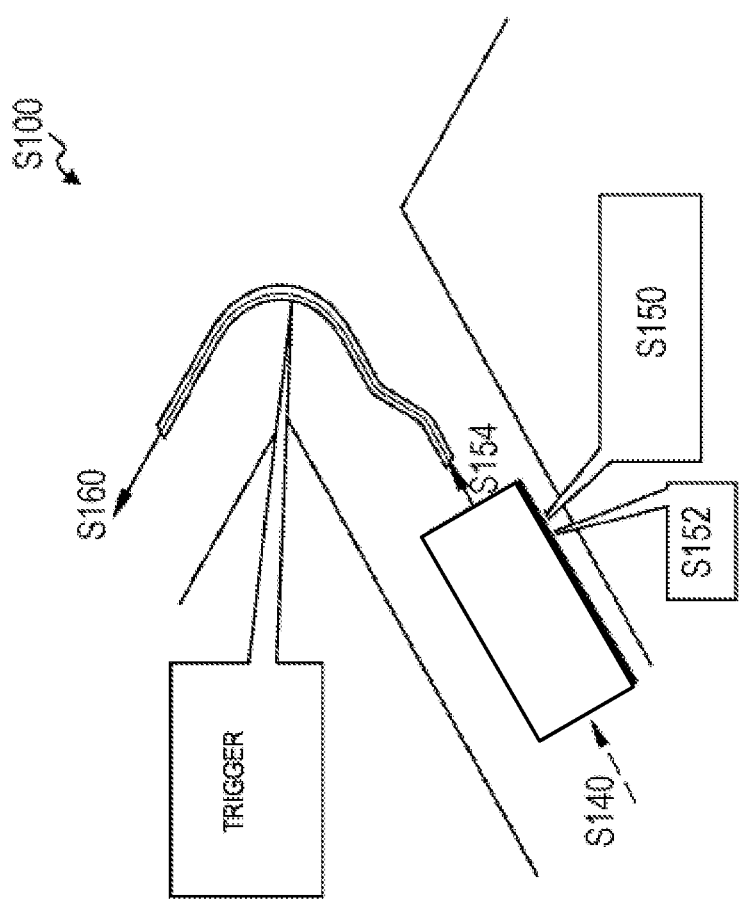
FIG. 2 is a flowchart representation of one variation of the method.
Figure 3A:
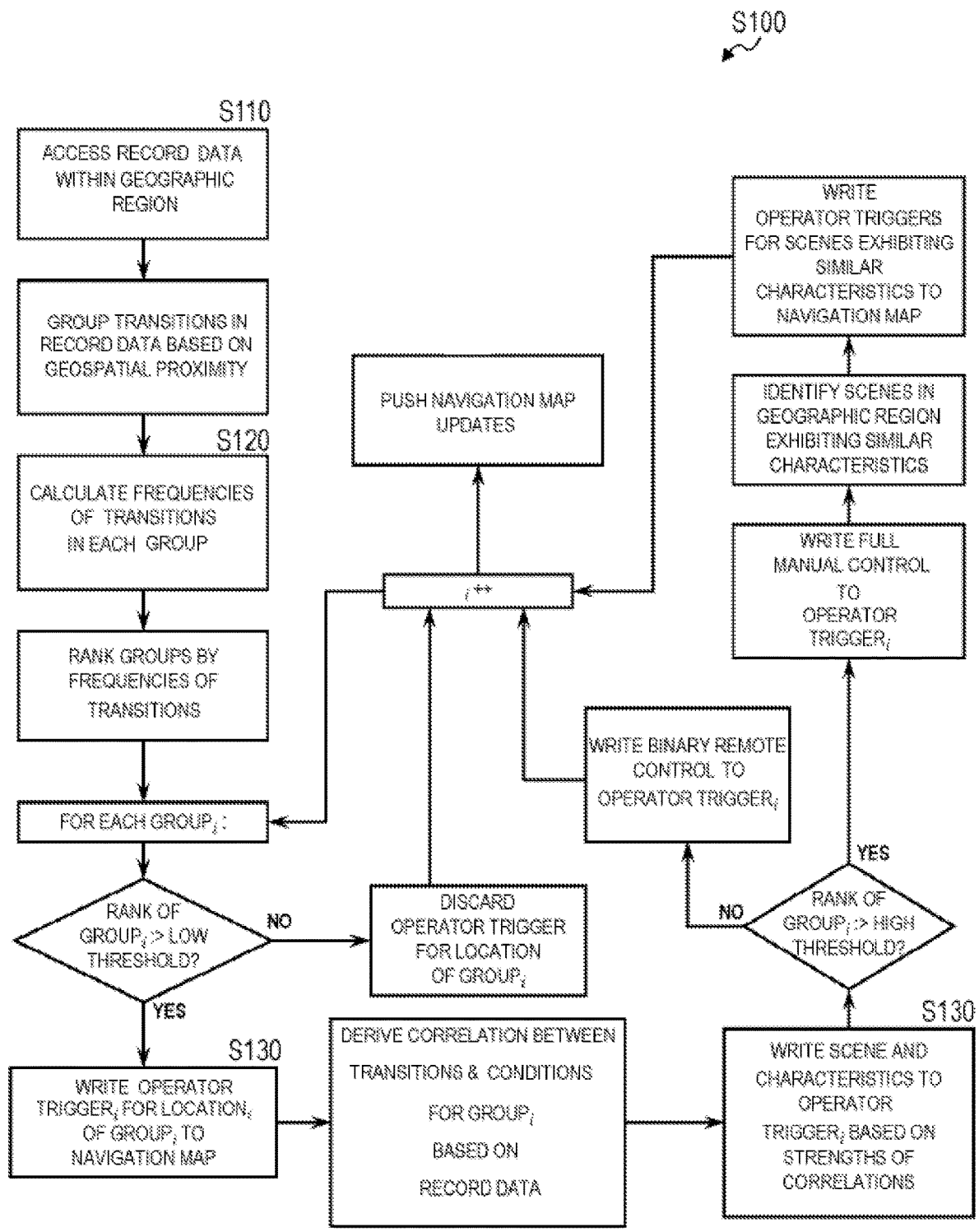
FIGS. 3A, 3B, and 3C are flowchart representations of variations of the method.

As shown in FIGS. 1, 2, and 3A, in one example, a method for transferring control of a mobile device, such as an autonomous vehicle, to an operator, such as a remote operator, includes, at a computer system: accessing a corpus of driving records of a fleet of autonomous vehicles operating within a geographic region in Block S110; identifying a road segment, within the geographic region, associated with a frequency of transitions, from autonomous operation to manual operation triggered by operators occupying autonomous vehicles in the fleet, that exceeds a threshold frequency based on the corpus of driving records in Block S120; and associating a location of the road segment, represented in a navigation map, with a remote operator trigger in Block S130. The method also includes, at the autonomous vehicle operating within the geographic region: autonomously navigating along a route in Block S140; transmitting a request for manual assistance to the remote operator in Block S150 in response to approaching the location associated with the remote operator trigger; transmitting sensor data to a remote operator portal associated with the remote operator in Block S152; executing a navigational command received from the remote operator via the remote operator portal in Block S154; and resuming autonomous navigation along the route after passing the location in Block S160.

Figure 3B:
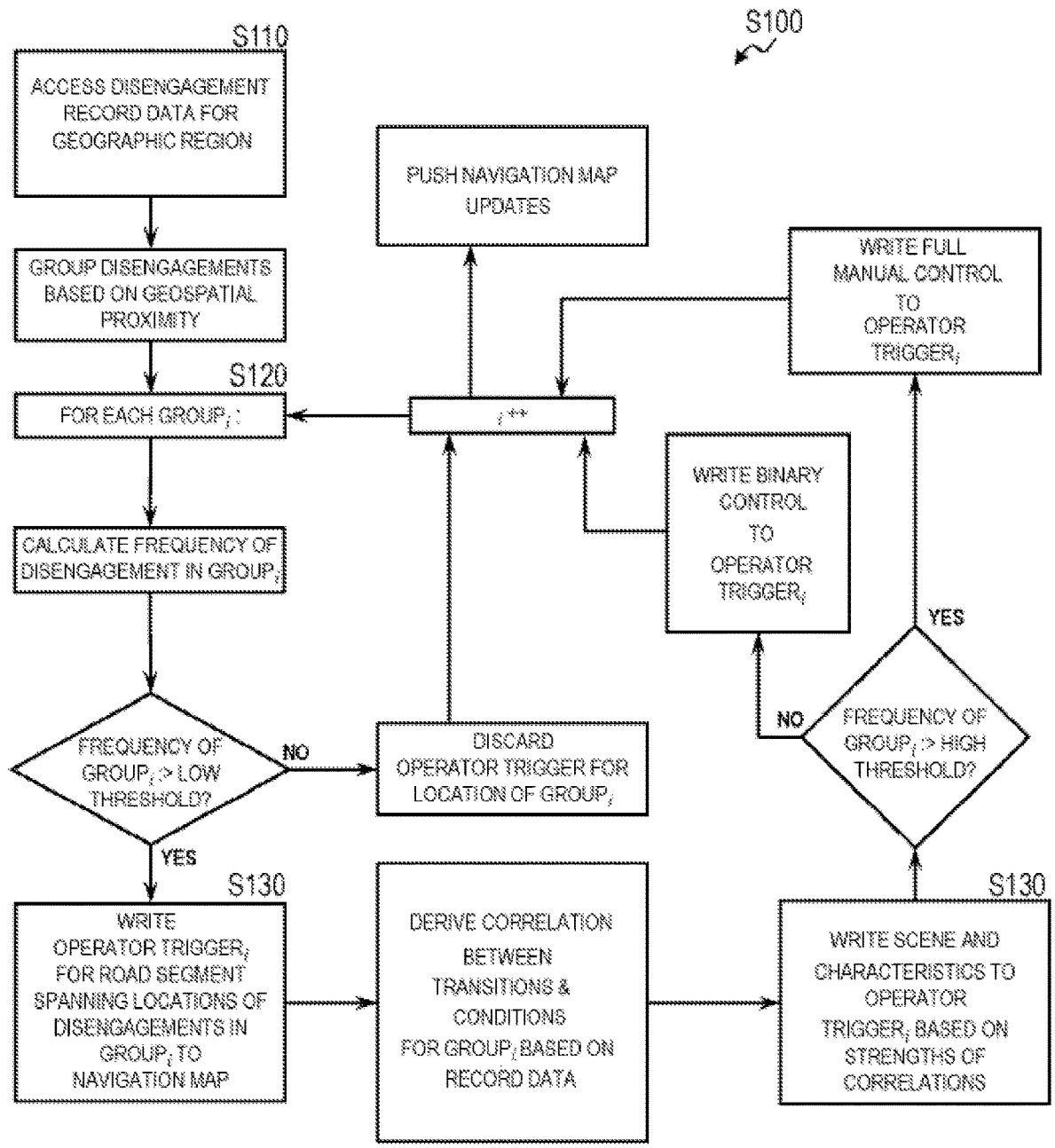
Figure 3C:
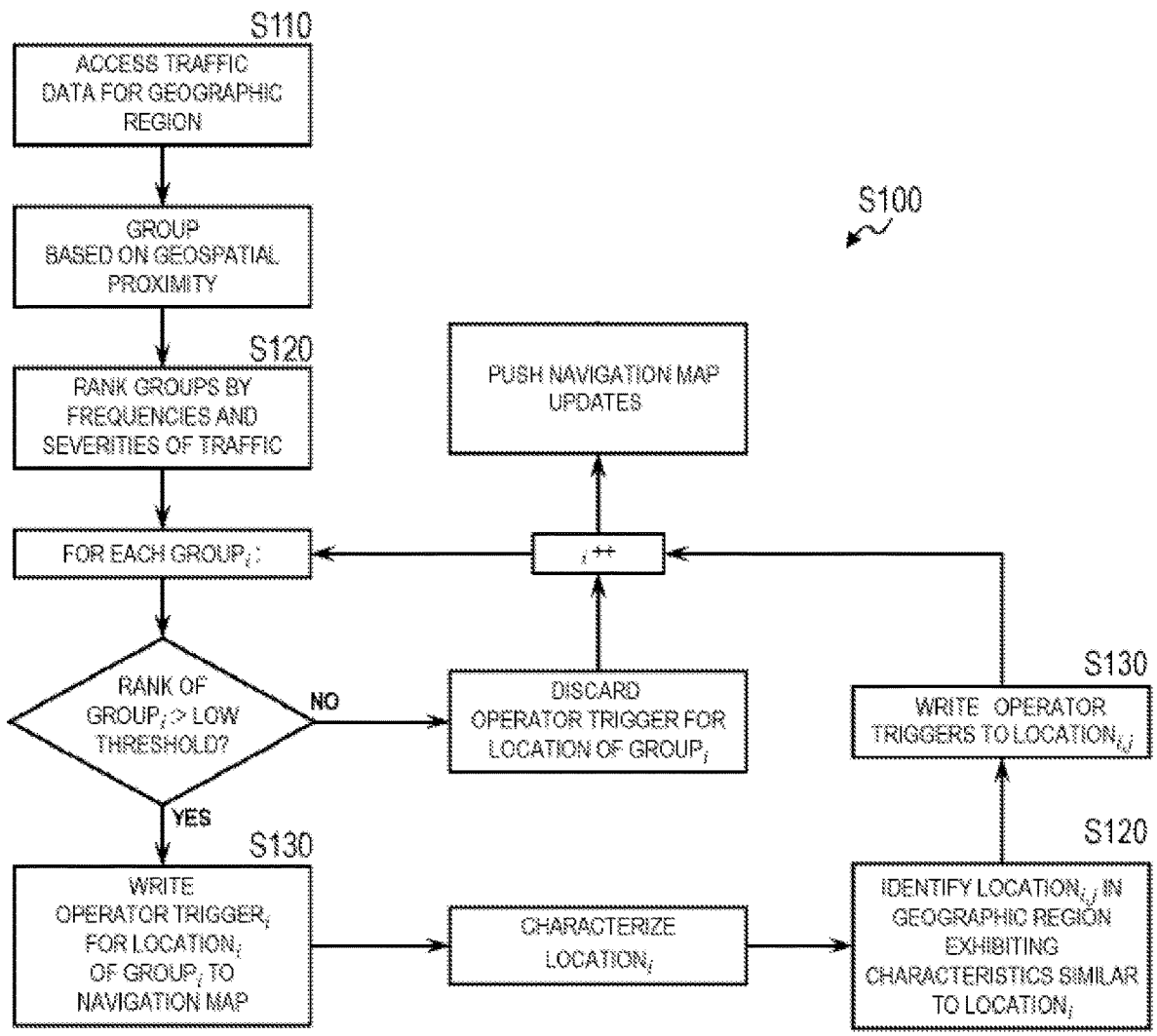

One variation of the method shown in FIG. 3C further includes, at the remote computer system: accessing a corpus of historical traffic accident data of human-operated vehicles involved in traffic accidents within a geographic region in Block S110; identifying a road segment, within the geographic region, associated with a frequency of traffic accidents that exceeds a threshold frequency based on the corpus of historical traffic accident data in Block S120; and associating a location of the road segment, represented in a navigation map, with a remote operator trigger in Block S130.

Another variation of the method shown in FIGS. 3A, 3B, and 3C further includes, at the remote computer system: accessing a specification for triggering manual control of autonomous vehicles in Block S110; identifying a road segment, within a geographic region, exhibiting characteristics defined by the specification in Block S120; and associating a location of the road segment, represented in a navigation map, with a remote operator trigger in Block S130.

Generally, Blocks of the method can be executed by a computer system (e.g., a computer network, a remote server) to preemptively annotate a navigation map with locations of remote operator triggers based on various existing data, such as: human-supervised autonomous vehicle test data; operating data recorded by autonomous vehicles while operating autonomously; accident data from human-operated vehicles; and/or characteristics of roads or intersections flagged for manual control. While autonomously navigating a planned route, an autonomous vehicle can execute other Blocks of the method to: automatically request remote operator assistance as the autonomous vehicle approaches a location of a remote operator trigger indicated in the navigation map; automatically cede decision-making or full operational control of the autonomous vehicle to a remote human operator; execute navigational commands received from the remote human operator to navigate through this location; and then resume autonomous operation upon passing this location or upon confirmation from the remote human operator to resume autonomous operation.

In particular, the remote computer system can access various historical data, such as: locations over which local human operators occupying autonomous vehicles took manual control of their autonomous vehicles (e.g., during autonomous vehicle testing); locations at which autonomous vehicles, operating autonomously, unexpectedly disengaged (e.g., due to an autonomous operation failure or inability to verify a next navigational action); and/or locations (and severity, cost) of accidents involving human-operated vehicles; etc. within a geographic region. Based on these historical data, the remote computer system can isolate discrete locations, intersections, lanes, and/or other road segments at which an autonomous vehicle may be at greater risk for collision with other vehicles, may be delayed in executing a next navigational action, or may execute a next navigational action with reduced confidence. The remote computer system can then populate a navigation map (or a localization map, a table, or other container) with remote operator triggers and related trigger parameters at geospatial locations of these flagged road segments.

For example, the remote computer system can: generate a heatmap of frequencies of manual control selections, autonomous vehicle disengagements, and/or traffic accidents per instance of traversal by a vehicle throughout the geographic region over a period of time; identify discrete geospatial locations or small geospatial areas within the heatmap exhibiting greatest frequencies of manual control selections, autonomous vehicle disengagements, and/or traffic accidents per instance of traversal by a vehicle; write a remote operator flag to the navigation map at each of these discrete geospatial locations or small geospatial areas; and push this navigation map (or a navigation map update) to each autonomous vehicle deployed to this geographic region. In this example, the remote computer system can also derive correlations between local conditions and these instances of manual control selections, autonomous vehicle disengagements, and/or traffic accidents—such as: time of day; local weather conditions; and an autonomous vehicle entering uncommon (e.g., five-way) intersections, entering railroad crossings, facing into the Sun, entering a school zone, nearing a large crowd of pedestrians, or approaching an unprotected left turn; etc. The remote computer system can then write these conditions to corresponding remote operator triggers in the navigation map (or localization map, table, or other container) in the form of trigger parameters.

During autonomous operation, an autonomous vehicle can: reference a localization map to determine its geospatial location; and reference the navigation map to elect and then execute navigational actions, such as accelerating, braking, turning, changing lanes, etc. along a planned route toward a specified destination. As the autonomous vehicle approaches a location of a remote operator trigger indicated by the navigation map (or in the localization map, table, or other container), the autonomous vehicle can automatically transmit a request for manual assistance to a remote operator (or to a remote operator manager more generally). Once a remote operator is assigned to assist the autonomous vehicle in navigating through this location, the autonomous vehicle can transition from autonomous navigation to remote manual control by the remote operator and can transmit (or "stream") video, LIDAR, and/or other sensor data to the remote operator portal associated with the remote operator in real-time. The remote operator can view these sensor data through her remote operator portal and elect to: delay a navigational action (e.g., in the autonomous vehicle's queue); confirm a navigational action; select from a predefined set of navigational actions; or manually adjust brake, accelerator, and/or steering positions accordingly. The autonomous vehicle can then transition back to full autonomous operation and resume full autonomous navigation along the planned route, such as: once the autonomous vehicle has moved past the location (or intersection, lane, and/or other road segment) linked to this remote operator trigger; or once the remote operator has confirmed—via the remote operator portal—transition back to autonomous operation.

For example, emergency scenario or accident data for training an autonomous vehicle solution may not be immediately available without involving autonomous vehicles (or vehicles outfitted with similar sensor suites) in a variety of different accidents while collecting sensor data from these autonomous vehicles. Therefore, an autonomous vehicle solution may not be trained to detect and respond to possible emergency scenarios or to detect and respond to emergency scenarios in which it is directly involved, such as: occupying a railroad crossing as a train approaches; navigating past a vehicle that has crossed into oncoming traffic near the autonomous vehicle; or approaching a large animal crossing a road ahead of the autonomous vehicle. In order to preemptively handle the possibility of such emergency scenarios throughout a geographic region, the remote computer system can: identify discrete locations, intersections, lanes, or other road segments at which emergency scenarios are particularly likely to occur (e.g., locations associated with transition to manual control by local human operators while occupying these autonomous vehicles, locations associated with accident frequencies that substantially exceed a threshold, average, or baseline value); and then annotate a navigation map or other container with remote operator triggers at corresponding locations. An autonomous vehicle approaching a location associated with a remote operator trigger can automatically and preemptively request assistance from a remote operator and serve sensor data to this remote operator prior to (e.g., ten seconds before) the autonomous vehicle's arrival at this flagged location, thereby enabling the remote operator to quickly perceive the scene around the autonomous vehicle and reliably assume manual control of the autonomous vehicle prior to the autonomous vehicle executing a higher-risk navigational action or disengaging due to a failure at the flagged location. A remote operator manager can also dynamically and predictively allocate remote human operators to assist autonomous vehicles approaching locations of remote operator triggers indicated in the navigation map as these autonomous vehicles operate (e.g., execute routes) within a geographic region. Altogether, the remote computer system, remote operator portal, and fleet of autonomous vehicles can cooperate to annotate a navigation map with locations of remote operator triggers and to implement this navigation map in order to reduce risk to autonomous vehicles entering known higher-risk scenarios and in order to maintain high operating efficiency for these autonomous vehicles.

In particular, the remote computer system can preemptively identify higher-risk road segments, road segments in which autonomous vehicles may be unable to detect and avoid risk, or road segments in which autonomous vehicles may be unable to confidently elect a next navigational action and to label a navigational map (or other container) with remote operator triggers at corresponding locations. An autonomous vehicle (or the remote computer system) can then automatically trigger a remote operator to assume control of the autonomous vehicle and to assist navigation of the autonomous vehicle as the autonomous vehicle approaches a road segment linked to a remote operator trigger in the navigation map in order to: reduce risk of collision with other vehicles or obstacles nearby; and/or maintain a high operating efficiency of the autonomous vehicle.

Block S110 of the method recites, during a scan cycle, recording multidimensional sensor images at multi-dimensional sensors arranged on the vehicle. Generally, in Block S110, an autonomous vehicle accesses sensor data from various sensors arranged on or integrated in the autonomous vehicle—such as distance scans from multiple LIDAR sensors and/or color 2D images from multiple color cameras—recorded approximately concurrently by sensors defining fields of view exhibiting some overlap over a distance range from the autonomous vehicle.

In one implementation, the autonomous vehicle includes: a suite of sensors configured to collect information about the autonomous vehicle's environment; local memory that stores a navigation map defining lane connections and nominal vehicle paths for a road area and a localization map that the autonomous vehicle implements to determine its location in real space; and a controller that governs actuators within the autonomous vehicle to execute various functions based on the navigation map, the localization map, and outputs of these sensors. In one implementation, the autonomous vehicle includes a set of 360° LIDAR sensors arranged on the autonomous vehicle, such as one LIDAR sensor mounted at each corner of the autonomous vehicle or a set of LIDAR sensors integrated into a roof rack mounted to the roof of the autonomous vehicle. Each LIDAR sensor can output one three-dimensional distance scan—such as in the form of a 3D point cloud representing distances between the LIDAR sensor and external surfaces within the field of view of the LIDAR sensor—per rotation of the LIDAR sensor (i.e., once per scan cycle).

The autonomous vehicle can also be outfitted (or retrofit) with additional sensors, such as: color cameras; 3D color cameras; a uni-dimensional or multidimensional (e.g., scanning) RADAR or infrared distance sensor; etc. The autonomous vehicle can implement similar methods and techniques to read data from these sensors.

The autonomous vehicle can then: identify (or "perceive") mutable objects nearby from these sensor data; regularly compare these data to features represented in a localization map in order to determine its location and orientation in real space; and identify a lane occupied by the autonomous vehicle, a local speed limit, a next navigational action, and/or proximity of a remote operator trigger location, etc. based on the autonomous vehicle's location and orientation and data stored in a navigation map. By regularly implementing these methods and techniques in conjunction with a planned route, the autonomous vehicle can autonomously navigate toward a destination location in Block S140.

Block S110 of the method recites accessing a corpus of driving records of a fleet of autonomous vehicles operating within a geographic region; Block S120 of the method recites identifying a road segment, within the geographic region, associated with a frequency of transitions, from autonomous operation to local manual operation triggered by local operators occupying autonomous vehicles in the fleet, that exceeds a threshold frequency based on the corpus of driving records; and Block S130 of the method recites associating a location of the road segment, represented in a navigation map, with a remote operator trigger. Generally, in Blocks S110, S120, and S130, the remote computer system can: access operational data collected from autonomous vehicles occupied by local human operators (e.g., "test drivers") during autonomous vehicle test periods on public roads; extract manual operator trends—such as location and or characteristics of adjacent road segments at times of manually-triggered transition from autonomous operation to manual operation—from these operational data; and then define remote operator triggers at road segments associated with higher frequencies of manually-triggered transition (and at locations exhibiting similarities to road segments associated with higher frequencies of manually-triggered transition), as shown in FIGS. 1 and 3A.

An autonomous vehicle solution may be tested on public roads, such as over hundreds, thousands, or millions of miles. A human operator occupying an autonomous vehicle during a test period may manually transition the autonomous vehicle from autonomous operation (e.g., an "autonomous mode") to manual operation (e.g., a "manual mode"), such as when the autonomous vehicle approaches a difficult intersection or in the presence of an unexpected obstacle (e.g., a vehicle, a pedestrian, an animal) near or in the path of the autonomous vehicle. The autonomous vehicle (and/or the remote computer system) can record characteristics of such instances of human-triggered transitions to manual control, such as including: locations; times of day; local traffic conditions; constellations of detected obstacles nearby; lanes occupied by autonomous vehicles; road characteristics (e.g., road surface quality, wetness, color, reflectivity); weather conditions; and/or position of the autonomous vehicle relative to the Sun, Sun intensity, or sensor obscuration due to sunlight; etc. at (and slightly before) local human operators triggered these autonomous-to-manual-operation transitions. The remote computer system can then aggregate these data in a remote database over time.

The remote computer system can then analyze these autonomous-to-manual-operation transitions and related data to isolate road segments and local conditions likely to necessitate remote manual control. In particular, a (significant) proportion of these autonomous-to-manual-operation transitions may be arbitrary (e.g., anomalous, haphazard). However, locations, times of day, local traffic conditions, and/or other conditions of some of these autonomous-to-manual-operation transitions may repeat with relatively high frequency over time. The remote computer system can therefore: aggregate locations of these autonomous-to-manual-operation transitions occurring during road test periods throughout a geographic region over time; and identify road segments over which local human operators commonly transition their autonomous vehicles from autonomous operation to manual control in Block S120, such as with greater absolute frequency, greater frequency per instance the road segment is traversed, or greater frequency per unit time.

For example, in Block S110, the remote computer system can access geospatial locations of instances of transition from autonomous operation to local manual operation triggered by local operators occupying autonomous vehicles in a fleet of autonomous vehicles over time (e.g., during test periods within a geographic region prior to deployment of this fleet of autonomous vehicles for full autonomous operation within this geographic region). The remote computer system can then aggregate instances of transition from autonomous operation to manual operation across this fleet of autonomous vehicles over time into a set of groups based on geospatial proximity of these transitions. For each group in this set of groups, the remote computer system can: calculate a frequency of autonomous-to-manual-operation transitions along a particular road segment—containing geospatial locations of autonomous-to-manual-operation transitions in this group—such as based on a ratio of total quantity of transitions in the first group to quantity of instances of autonomous vehicles in the fleet traversing this road segment; and then flag this road segment if this frequency of transitions exceeds a threshold frequency (e.g., 30%) in Block S120. The remote computer system can then write a remote operator trigger to each of these flagged road segments in a navigation map for this geographic region.

Furthermore, in the foregoing example, the remote computer system can: access times of these instances of transition from autonomous operation to manual operation; and aggregate these autonomous-to-manual-operation transitions into groups further based on temporal proximity (e.g., occurring during the same day of the week and/or during similar times of day). For each group in this set, the remote computer system can: flag a road segment—containing geospatial locations of autonomous-to-manual-operation transitions in this group—if the frequency of transitions along this road segment within a time window represented in this group exceeds a threshold frequency in Block S120; and then write a remote operator trigger with a constraint of this time window to this flagged road segment in the navigation map in Block S130. In this example, the remote computer system can thus limit a remote operator trigger for a road segment flagged in the navigation map according to a time window; and the autonomous vehicle can transmit a request for manual assistance to a remote operator only upon approaching this road segment during the time window defined in this remote operator trigger.

In a similar example shown in FIG. 3A, the remote computer system accesses both: geospatial locations of autonomous-to-manual-operation transitions triggered by local operators occupying autonomous vehicles in the fleet; and scene characteristics (e.g., local traffic conditions, constellations of obstacles nearby, road surface quality, road wetness, road color, road reflectivity, local weather conditions) proximal autonomous vehicles during these autonomous-to-manual-operation transitions in Block S110. The remote computer system then aggregates autonomous-to-manual-operation transitions into a set of groups based on both geospatial proximity and similarity of scene characteristics proximal autonomous vehicles during these transitions. For each group in this set, the remote computer system can: flag a road segment—containing geospatial locations of autonomous-to-manual-operation transitions in this group—if the frequency of transitions occurring along this road segment concurrently with a particular scene characteristic representative of this group exceeds a threshold frequency in Block S120; and then write a remote operator trigger with a constraint of this particular scene characteristic to this flagged road segment in the navigation map in Block S130. In this example, the remote computer system can thus limit a remote operator trigger for a road segment flagged in the navigation map according to a scene characteristic (or a constellation of scene characteristics); and the autonomous vehicle can transmit a request for manual assistance to a remote operator only upon detecting this scene characteristic (or a constellation of scene characteristics) when approaching this road segment.

In a similar example, the remote computer system can: access offsets between anteroposterior axes of autonomous vehicles and the Sun during autonomous-to-manual-operation transitions in Block S110; identify a group of autonomous-to-manual-operation transitions occurring at geospatial locations along a road segment concurrent with solar offsets—between anteroposterior axes of autonomous vehicles and the Sun—that fall within a solar offset window in Block S120; write a remote operator trigger to this road segment in the navigation map if this frequency of autonomous-to-manual-operation transitions in this group exceeds a threshold frequency in Block S130; and then limit this remote operator trigger according to this solar offset window in Block S130. The remote computer system can similarly calculate this solar offset window based on positions of autonomous vehicles relative to the Sun when solar radiation overwhelmed sensors (e.g., color cameras, LIDAR sensors) in these autonomous vehicles, such as along this road segment, and associate a remote operator trigger and solar offset window with this road segment accordingly. Later, as an autonomous vehicle approaches this road segment, the autonomous vehicle can transmit a request for manual assistance to a remote operator if the offset between an anteroposterior axes of the autonomous vehicle and the Sun falls within this solar offset window.

In a similar example, the remote computer system can: detect presence (e.g., quantities) of pedestrians proximal autonomous vehicles during autonomous-to-manual-operation transitions in Block S110; identify a group of autonomous-to-manual-operation transitions occurring at geospatial locations along a road segment concurrent with presence of a minimum quantity (or a range) of pedestrians in Block S120; write a remote operator trigger to this road segment in the navigation map if this frequency of autonomous-to-manual-operation transitions in this group exceeds a threshold frequency in Block S130; and then limit this remote operator trigger according to this minimum quantity (or a range) of pedestrians in Block S130. Later, as an autonomous vehicle approaches this road segment, the autonomous vehicle can transmit a request for manual assistance to a remote operator if the autonomous vehicle has detected at least the minimum quantity of pedestrians in its vicinity.

In the foregoing examples, the remote computer system can generate a heatmap of autonomous-to-manual-operation transitions during autonomous vehicle test periods throughout a geographic region, such as with groups of transitions weighted by spatial density and by ratio of number of transitions to total autonomous vehicle traversals across road segments in this geographic region. The remote computer system can then rank road segments in this geographic region by intensity in the heatmap. When a fleet of autonomous vehicles is deployed to operate autonomously in the geographic region, the remote computer system (or autonomous vehicles) can dynamically set and clear remote operator triggers at road segments within this geographic region based on rank of these road segments and availability of remote operators to handle remote operator requests from these autonomous vehicles. In particular, the remote computer system can implement load balancing techniques to activate remote operator triggers for highest-ranking road segments and to selectively activate remote operator triggers for lower-ranking road segments responsive to increased availability of remote operators to respond to remote operator requests from these autonomous vehicles.

The remote computer system can then selectively annotate a navigation map with remote operator triggers in Block S130. For example, the remote computer system can annotate the navigation map with remote operator triggers at discrete locations, intersections, lanes, and/or segments of roadway at which local human operators in these autonomous vehicles frequently elected manual control. For example, the remote computer system can annotate the navigation map with a remote operator trigger for each discrete road segment and vehicle direction: over which local operators elected manual control of their autonomous vehicles more than a threshold number of times per instance that an autonomous vehicle traversed this road segment; or over which local operators elected manual control of their autonomous vehicles more than a threshold number of times per unit time; etc.

However, the autonomous vehicle can implement any other methods or techniques to extract manual control locations from historical autonomous vehicle test data and to automatically annotate the navigation map with remote operator triggers.

In one variation shown in FIG. 3B, the remote computer system defines remote operator triggers based on historical autonomous vehicle disengagements—that is, instances in which autonomous vehicles in the fleet automatically ceased autonomous operation, such as due to failure of an autonomous technology, inability to perceive their surroundings with sufficient confidence, or inability to verify next navigational actions.

In this variation, the remote computer system can: identify a road segment associated with a frequency of autonomous-to-manual-operation transitions—triggered by autonomous vehicles, rather than by local human operators occupying these autonomous vehicles—that exceeds a threshold frequency based on the corpus of driving records accessed in Block S110; and then associate a location of this road segment, represented in the navigation map, with a remote operator trigger in Block S130. In this variation, the remote computer system can also implement methods and techniques described above to associate this remote operator trigger with addition conditions.

In one variation shown in FIG. 3C: Block S110 of the method includes accessing historical accident data of human-operated vehicles involved in road accidents within a geographic region; and Block S120 of the method includes identifying a road segment, within the geographic region, associated with a frequency of accidents exceeding a threshold accident frequency. Generally, in this variation, the remote computer system can: access road vehicle accident data, such as from an accident database for human-operated vehicles, in Block S110; and then extract trends from these data to identify locations (and local conditions) for which greater risk of accidents or collisions exist in Block S120. The remote computer system can then define remote operator flags for these locations (and conditions) and write these remote operator flags to the navigation map (or other container) accordingly in Block S130, as shown in FIGS. 1 and 3C.

In one implementation, the remote computer system extracts, from available accident data: geospatial locations (e.g., latitudes and longitudes); lane identifiers; and directions of motion of vehicles involved in recorded accidents. The remote computer system can also extract, from these accident data: navigational actions; days; times of day; weather conditions; numbers and types of vehicles involved (e.g., cars, trucks, cyclists); numbers of pedestrians involved; accident severities (e.g., minor impact, vehicle totaled); types of accidents (e.g., rear-end collisions, side-impact collisions, sideswipe collisions, vehicle rollover, head-on collisions, or multi-vehicle pileups); etc. of recorded accidents and vehicles involved in these accidents.

The remote computer system can then compile these accident data into a geospatial heatmap of accidents. For example, the remote computer system can weight each incidence of a recorded accident by: how recently the accident occurred; a number of vehicles involved in the accident; and/or a severity of the accident (e.g., as a function of total cost of vehicle damage and human injuries). The remote computer system can then flag discrete geospatial locations, specific intersections, or specific road segments (e.g., a 100-meter lengths of road) over which weighted rates of accidents per unit vehicle passing this location or per unit time exceed a threshold rate. (In this example, the remote computer system can adjust the threshold rate as a function of availability of remote operators.)

Upon amassing a set of discrete geospatial locations, specific intersections, and/or specific road segments at which accidents have occurred in the past, such as with significant frequency and/or severity, the remote computer system can write remote operator triggers to these locations, intersections, and/or road segments in the navigation map in Block S130, as described above.

The remote computer system can also write a weight (or "priority") value to each of these remote operator triggers; and the autonomous vehicle and the remote computer system can cooperate to selectively engage a remote operator to assist the autonomous vehicle in passing a location of a remote operator trigger based on a weight assigned to this remote operator trigger and current resource load at the remote operator manager (i.e., based on current availability of remote operators), as described below.

Therefore, the remote computer system can: access a corpus of historical traffic accident data of manually-operated vehicles involved in traffic accidents within a geographic region in Block S110; identify a road segment—within this geographic region—associated with a frequency of traffic accidents that exceeds a threshold frequency in Block S120 based on this corpus of historical traffic accident data; and associate a location of this road segment with a remote operator trigger accordingly in Block S130.

In another variation, Block S110 of the method recites accessing a specification for triggering manual control of autonomous vehicles; and Block S120 of the method recites identifying a road segment, within a geographic region, exhibiting characteristics defined by the specification. Generally, in this variation, the remote computer system can: access a remote operator trigger specification defined by a human or generate a remote operator trigger specification based on historical autonomous vehicle operation and remote operator data in Block S110; then scan a navigational map, autonomous vehicle data, and/or existing traffic data, etc. for a geographic region for locations associated with characteristics that match the remote operator trigger specification; and flag these locations for assignment of remote operator triggers.

In one implementation shown in FIG. 1, the remote computer system: accesses a manual list of characteristics of locations of remote operator triggers or automatically characterizes these locations based on available test period and/or accident data in Block S110; and then scans a navigation map for discrete locations, intersections, and/or road segments that exhibit similar characteristics in Block S120. In this implementation, the remote computer system can automatically populate the navigation map with remote operator triggers based on characteristics of roadways represented in the navigation map rather than specifically as a function of past manual control and/or accident locations.

In another implementation, the remote computer system further processes manual control data for autonomous vehicle test periods—described above—and extracts additional trends from these data, such as: autonomous vehicle direction; lane occupied by an autonomous vehicle; navigational action (e.g., turning, lane change, merging) performed before, during, and/or after an autonomous-to-manual-operation transition; times of day; local traffic conditions (e.g., vehicle traffic density and speed); lengths of road segments traversed during autonomous-to-manual-operation transitions; types and proximity of obstacles near an autonomous vehicle during an autonomous-to-manual-operation transition; etc. Based on these trends, the remote computer system can correlate various parameters—such as navigational action, intersection type, road segment type, etc.—to elected manual control of autonomous vehicles. In particular, the remote computer system can implement pattern recognition, regression, or other techniques to correlate local operator manual control of autonomous vehicles to certain characteristics of intersections or road segments. For example, the remote computer system can identify discrete lane segments and navigational actions over which local human operators are likely to elect manual control of autonomous vehicles, such as: right turns exceeding 110°; navigating through railroad crossings; navigating through road construction; unprotected left turns; etc. The remote computer system can then: scan the navigation map for road segments or intersections, etc. that exhibit substantially similar characteristics in Block S120; and annotate the navigation map with remote operator triggers at these locations accordingly in Block S130, as described above.

The remote computer system can implement similar methods and techniques to correlate accidents with certain characteristics of intersections or road segments in Block S110 and then scan and annotate the navigation map accordingly in Block S120 and S130.

In one example, the remote computer system correlates unprotected left turns with above-average rates of manual control by local operators and/or above-average rates of accidents in Block S120. Accordingly, the remote computer system identifies all unprotected left turns represented in the navigational map and labels the corresponding locations as remote operator triggers in Block S130. The autonomous vehicle thus submits a request for manual assistance in Block S150 upon approaching an unprotected left turn.

In the foregoing example, the remote computer system can also identify a correlation between unprotected left turns and manual control by local operators and/or above-average rates of accidents during high-traffic periods, when local traffic is moving at high speed, or during particular times of day. The remote computer system can then annotate the navigation map with remote operator triggers—including temporal, traffic, and/or other local condition parameters—at locations of known unprotected left turns represented in the navigation map in Block S130. Upon approaching an unprotected left turn at a time specified by a corresponding remote operator trigger in the navigation map or when local traffic conditions match or exceed minimum traffic conditions specified by the remote operator trigger, the autonomous vehicle can submit a request for manual assistance in Block S150 and then automatically transition to manual control by the remote operator, such as upon entering the corresponding unprotected left turn lane, in Block S154. Upon completing the left turn under manual control or guidance, the autonomous vehicle can transition back to autonomous navigation. However, if the autonomous vehicle determines that conditions specified by the remote operator trigger have not been met—based on data collected by the autonomous vehicle in real-time as the autonomous vehicle approaches this unprotected left turn—the autonomous vehicle can autonomously navigate through the unprotected left turn with remote operator assistance.

In another example, the remote computer system annotates the navigation map with remote operator triggers at locations of all known railroad crossings. The computer vision can also write a conditional traffic-related statement to remote operator triggers for these known railroad crossings, such as confirmation to request remote operator assistance if another vehicle is stopped in the autonomous vehicle's lane, on the other side of the railroad crossing, and within a threshold distance of the railroad crossing (e.g., three car lengths or twenty meters).

In a similar implementation shown in FIGS. 3A and 3C, after assigning a remote operator trigger to a road segment in Block S130, the remote computer system can: derive a set of characteristics of the road segment; scanning the navigation map—of the geographic region containing this road segment—for a second road segment exhibiting characteristics similar to those of the road segment; associate a second location of the second road segment with a second remote operator trigger; in Block S130; and write this remote operator trigger to the navigation map (or other container).

The remote computer system can therefore automatically identify additional road segments—that may obligate remote manual operation over autonomous operation for deployed autonomous vehicles—in a geographic region, even if historical data for autonomous vehicle operation through these road segments is unavailable or limited, based on similarities between these additional road segments and road segments previously associated with remote operator triggers.

In one variation, the remote computer system can derive a constellation of location-agnostic scene characteristics and/or autonomous vehicle characteristics exhibiting high correlation with autonomous-to-manual-operation transitions, autonomous vehicle disengagements, traffic accidents, etc. from historical data described above, such as by implementing regression or deep learning techniques. The remote computer system can then define remote operator triggers for deployed autonomous vehicles based on this constellation of location-agnostic scenes and/or autonomous vehicle characteristics. For example, the remote computer system can define a constellation of location-agnostic scene characteristics and/or autonomous vehicle characteristics including: damp-to-wet road condition; solar offset window (e.g., within the range of +/−15° zenith and +/−20° azimuthal to the Sun); and pedestrian present. Thus, when an autonomous vehicle operating in an autonomous mode detects a pedestrian and falls within this solar offset window during or after rainfall, the autonomous vehicle can serve a request to the remote operator manager for remote operator assistance according to this location-agnostic remote operator trigger.

Block S140 of the method recites, at an autonomous vehicle, autonomously navigating along a route; and Block S150 recites, at the autonomous vehicle, transmitting a request for manual assistance to the remote operator in response to approaching the location associated with the remote operator trigger. Generally, in Block S140, the autonomous vehicle can implement autonomous navigation techniques to autonomously navigate from a start location (e.g., a pickup location specified by a rideshare user), along a route, toward a destination location (e.g., a dropoff location specified by the rideshare user). While navigating along this route, the autonomous vehicle can monitor its location and/or characteristics of a scene around the autonomous vehicle for condition specified in a remote operator trigger, such as defined in a navigation map stored locally on the autonomous vehicle. Thus, as the autonomous vehicle approaches a road segment specified in a remote operator trigger (and confirms scene and/or autonomous vehicle characteristics specified in this remote operator trigger, such as traffic, weather, and time of day conditions), the autonomous vehicle can transmit a request for human assistance to a remote operator. Accordingly, the autonomous vehicle can cede operational controls to a remote operator in Block S154 until the autonomous vehicle passes the road segment or until autonomous control is returned to the autonomous vehicle by the remote operator. In particular, the autonomous vehicle can identify a set of conditions (e.g., autonomous vehicle location and orientation, local conditions) that fulfill a remote operator trigger and, accordingly, automatically return a request for manual human assistance to a remote operator manager (or to a remote operator directly).

In one implementation, while autonomously navigating along a route that intersects a location of a remote operator trigger defined in the navigation map (or other container), the autonomous vehicle: estimates its time of arrival at this location; and then transmits a request for manual assistance to the remote operator manager in response to this time of arrival falling below a threshold duration (e.g., ten seconds; or five seconds when the autonomous vehicle is travelling at ten miles per hour, ten seconds when the autonomous vehicle is travelling at thirty miles per hour, and fifteen seconds when the autonomous vehicle is travelling at sixty miles per hour).

Alternatively, the remote computer system can define a remote operator trigger along a length of road segment in Block S130; and the autonomous vehicle can automatically transmit a request for manual assistance to the remote operator manager in Block S150 in response to entering this road segment. For example, the remote computer system can define a georeferenced boundary around a cluster of autonomous-to-manual-operation transitions and offset outwardly from a perimeter of this cluster by a trigger distance (e.g., 30 meters) and link this georeferenced boundary to a remote operator trigger for a road segment in Block S130. Upon crossing this georeferenced boundary and entering this road segment (and upon confirming other conditions specified in the remote operator trigger), the autonomous vehicle can automatically transmit a request for manual assistance to the remote operator manager in Block S150.

Upon receipt of a request for manual assistance from the autonomous vehicle, the remote operator manager can: select a particular remote operator from a set of available remote operators; and then route sensor data—received from the autonomous vehicle in Block S152 described below—to a remote operator portal associated with the remote operator, such as via a computer network. For example, upon receipt of a request for manual assistance from the autonomous vehicle responsive to a remote operator trigger, the remote operator manager can selectively reject the autonomous vehicle's request or connect the autonomous vehicle to an available remote operator based on a weight or priority associated with this remote operator trigger and based on current resource load (i.e., availability or remote operators). In this example, the remote operator manager can implement resource allocation techniques to assign autonomous vehicles approaching locations of highest-priority remote operator triggers to available remote operators first, then assign autonomous vehicles approaching locations of lower-priority remote operator triggers to available remote operators up until a target resource load is met (e.g., 90% of remote operators are currently assisting autonomous vehicles).

Alternatively, the autonomous vehicle can serve a request for manual assistance directly to a remote operator. For example, a remote operator can be assigned a preselected set of autonomous vehicles currently in operation with a geographic region, and the remote operator can monitor low-resolution sensor data—streamed from these autonomous vehicles when operating within the geographic region—through her remote operator portal. When the autonomous vehicle enters or approaches a road segment associated with a remote operator trigger, the autonomous vehicle can return a request for remote operator control and return high-resolution sensor data (e.g., lower compression, larger sized, and/or greater frame rate color camera data) directly to the remote operator's portal in Block S150. Accordingly, the remote operator portal can surface a sensor feed from the autonomous vehicle, enable remote controls for the autonomous vehicle, and prompt the remote operator to remotely engage the autonomous vehicle.

Yet alternatively, the remote computer system can automatically: track an autonomous vehicle; generate a request for manual assistance for the autonomous vehicle when conditions of a remote operator trigger are met at the autonomous vehicle; and serve this request to a remote operator. For example, the autonomous vehicle can stream low-resolution sensor, perception, and/or telemetry data to the remote computer system throughout operation. The remote computer system can then automatically queue a remote operator to assume manual control of the autonomous vehicle when telemetry data received from the autonomous vehicle indicates that the autonomous vehicle is approaching a location assigned a remote operator trigger and when low-resolution perception data (e.g., types and locations of objects detected in camera and/or LIDAR data recorded by the autonomous vehicle) received from the autonomous vehicle indicates that conditions of this remote operator trigger are met.

However, the autonomous vehicle, the remote operator manager, and/or the remote computer system can implement any other method or technique to selectively connect the autonomous vehicle to a remote operator responsive to a request for manual assistance based on a remote operator trigger.

Figure 4:
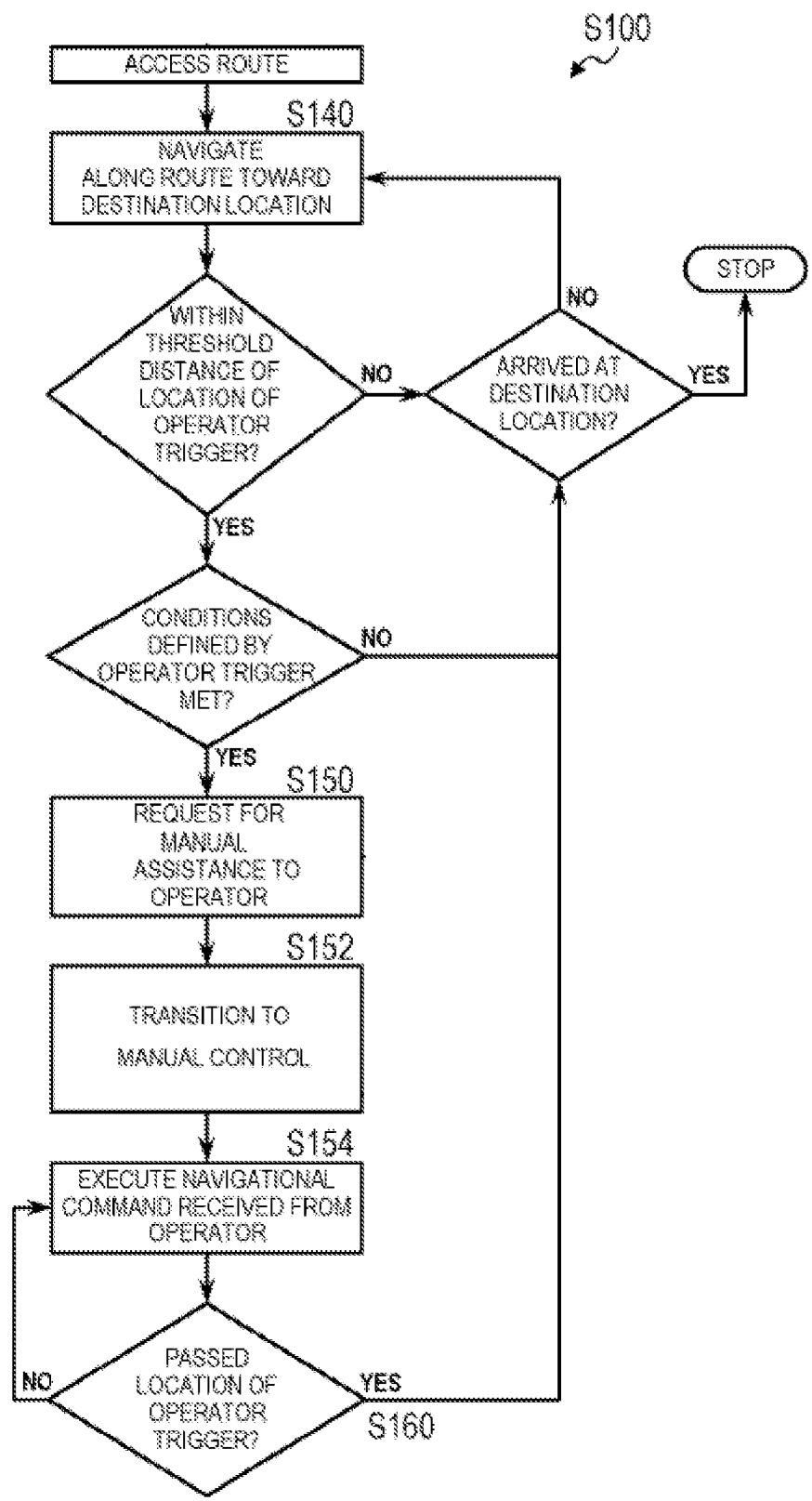
FIG. 4 is a flowchart representation of one variation of the method.

The method further includes: Block S152, which recites transmitting sensor data to a remote operator portal associated with the remote operator; Block S154, which recites executing a navigational command received from the remote operator via the remote operator portal; and Block S160, which recites, in response to passing the location, resuming autonomous navigation along the planned route in Block S160. Generally, in Block S152, the autonomous vehicle can serve data—such as raw sensor, perception, and/or telemetry data sufficient for enabling a remote operator to efficiently and reliably trigger a navigational action or assume manual control of the autonomous vehicle—to a remote operator. The autonomous vehicle can then: execute commands received from the remote operator in Block S154 in order to navigate through or past the road segment linked to the remote operator trigger; and transition back to autonomous operation in Block S160 upon exiting this road segment and/or upon confirmation from the remote operator to resume autonomous navigation, as shown in FIGS. 2 and 4.

For example, once the autonomous vehicle determines that conditions of the remote operator trigger are met, returns a request for manual assistance to the remote operator, and/or receives confirmation of manual assistance from the remote operator or remote operator manager at an initial remote operation time, the autonomous vehicle can stream raw sensor data, perception data (e.g., perception of a scene around the autonomous vehicle derived from raw sensor data recorded through sensors in the autonomous vehicle), and/or telemetry data to the remote operator portal in real-time over a wireless computer network following the initial remote operation time. The autonomous vehicle can concurrently transition control of some or all actuators in the autonomous vehicle to the remote operator portal.

In one implementation shown in FIGS. 1 and 2, as the autonomous vehicle approaches the location of a remote operator trigger and once a remote operator is assigned to the autonomous vehicle, the autonomous vehicle (or the remote operator manager) enables a binary control function of the autonomous vehicle at the remote operator's portal, such as including: a confirm function to trigger the autonomous vehicle to execute a preselected navigational action (e.g., enter an intersection or execute a left turn through the road segment associated with the remote operator trigger); and a delay function to delay execution of this preselected navigational action.

In one example, the remote computer system: writes a remote operator trigger to an unprotected left turn in the navigation map; and assigns a binary control function—including navigational action confirmation and delay options—to this remote operator trigger in Block S130. As the autonomous vehicle traverses its assigned route and approaches this unprotected left turn in Block S140, the autonomous vehicle can: query the remote operator manager for remote manual control according to these binary control functions in Block S150. Once the remote operator manager assigns a remote operator to the autonomous vehicle, the autonomous vehicle can stream sensor data to the remote operator manager in Block S152, such as: color camera feeds from forward-, left-, and right-facing cameras on the autonomous vehicle; composite point clouds containing concurrent data output by multiple LIDAR sensors on the autonomous vehicle; telemetry data; and/or vehicle speed, braking position, and accelerator position data; etc. The remote operator manager can then distribute these sensor feeds to the operator portal associated with this remote operator.

In this example, as the autonomous vehicle nears the unprotected left turn, the autonomous vehicle can autonomously slow to a stop just ahead of this intersection while awaiting a command from the remote operator. Simultaneously, the remote operator portal can render these sensor data for the remote operator in (near) real-time and enable binary controls for the autonomous vehicle. Upon determining that the autonomous vehicle has right of way to enter the intersection ahead and will avoid oncoming traffic when executing a left turn action, the remote operator can submit confirmation to execute the planned left turn action; upon receipt of confirmation to execute the planned left turn action, the autonomous vehicle can resume autonomous execution of its planned route, including entering the intersection ahead and autonomously executing the left turn, in Blocks S154 and S160.

Therefore, in this example, the autonomous vehicle can: slow to a stop in response to approaching a location associated with a remote operator trigger; transmit a request for manual confirmation to resume autonomous navigation along the route as the autonomous vehicle slows upon approach to this location; and then resume autonomous navigation along this route—past the location specified by the remote operator trigger—in response to receipt of binary, manual confirmation from the remote operator.

In a similar implementation, the remote computer system can assign multiple possible navigational actions—such as "delay," "sharp left," "sweeping left," "slow left," and/or "fast left"—to a remote operator trigger in Block S130. As an autonomous vehicle approaches the location specified by this remote operator trigger, the autonomous vehicle can transmit a request to the remote operator manager for manual assistance; and the remote operator manager can assign the autonomous vehicle to a remote operator and enable selection of navigational actions specified by this remote operator trigger at this remote operator's portal. The autonomous vehicle can then execute navigational actions selected by the remote operator via the remote operator portal in Block S154.

Once the remote operator confirms one or a subset of these navigational actions, once the autonomous vehicle has moved fully past the location specified in this remote operator trigger, and/or once the remote operator confirms transition back to autonomous operation, the autonomous vehicle can return to full autonomous operation in Block S160.

In another implementation, the remote computer system assigns full manual control of an autonomous vehicle—such as including control of brake, accelerator, and steering actuators in the autonomous vehicle—to a remote operator trigger in Block S130. Thus, as an autonomous vehicle approaches the location specified in this remote operator trigger while autonomously navigating along a planned route, the autonomous vehicle can request assistance from a remote operator in Block S150. Once the remote operator manager assigns the autonomous vehicle to a remote operator, the autonomous vehicle, the remote computer system, and the remote operator's portal can cooperate to transition real-time drive-by-wire controls of brake, accelerator, and steering positions in the autonomous vehicle to the remote operator portal.

For example, once the remote operator is assigned to assist the autonomous vehicle: the autonomous vehicle can stream sensor data to the remote operator manager for distribution to the remote operator portal in Block S152; and the autonomous vehicle and the computer system can cooperate to transition from 100% autonomous/0% manual control of actuators in the autonomous vehicle to 0% autonomous/100% manual control of these actuators over a period of time (e.g., four seconds). The remote operator can thus assume full manual control of the autonomous vehicle—such as via a joystick or other interface connected to the remote operator portal—and remotely navigate the autonomous vehicle through the location or road segment associated with this remote operator trigger.

Furthermore, once the autonomous vehicle is fully past the location or road segment linked to this remote operator trigger—such as confirmed by the remote operator—the autonomous vehicle and the remote computer system can cooperate to transition from 0% autonomous/100% manual control back to 100% autonomous/0% manual control, such as instantaneously or over a period of time (e.g., two seconds) in Block S160.

Therefore, in response to confirmation of manual assistance from the remote operator, the autonomous vehicle can transfer braking, acceleration, and steering controls of the autonomous vehicle to the remote operator portal; and then execute braking, acceleration, and/or steering commands received from the remote operator portal in Block S154. The autonomous vehicle can then: cease transmission of sensor data to the remote operator portal and resume autonomous navigation along its assigned route after passing the location and/or in response to receipt of confirmation from the remote operator to resume autonomous navigation in Block S160.

In one variation, the remote computer system (or the remote operator portal) identifies multiple autonomous vehicles scheduled or anticipated to approach a location of a remote operator trigger within a short period of time and then assigns a single remote operator to manually assist each of these autonomous vehicles as they sequentially traverse this location. For example, the remote computer system can group a string of five autonomous vehicles (out of eight total vehicles) in-line at an unprotected left turn and enable manual control of these vehicles to a single remote operator; the remote operator can then manually confirm execution of a left turn action for each autonomous vehicle in the group individually or for the group of autonomous vehicles as a whole.

Therefore, in this variation, because a remote operator may become increasingly familiar with a segment of road, an intersection, current traffic conditions, current weather conditions, current pedestrian traffic, etc. near a location or road segment linked to a remote operator trigger as the remote operator handles manual assistance requests from autonomous vehicles passing this location or road segment over time, the remote computer system can reduce cognitive load on the remote operator by continuing to assign autonomous vehicles approaching this location or road segment to this same remote operator, such as within a short, contiguous duration of time. In particular, the remote computer system can assign the same remote operator to multiple autonomous vehicles passing through a particular remote operator trigger location within a limited period of time in order to enable the remote operator to make rapid, higher-accuracy navigational decisions for these autonomous vehicles and with less cognitive load.

Once a number of autonomous vehicles approaching this remote operator trigger location drops below a preset threshold quantity or frequency, the remote computer system can transition the remote operator to assist other autonomous vehicles passing or approaching other locations or road segments in the geographic region associated with remote operator triggers.

Alternatively, the remote computer system can dedicate a particular remote operator trigger to a single remote operator, such as over the full duration of this remote operator's shift. Therefore, in this variation, the remote computer system can assign this particular remote operator to assist each autonomous vehicle that approaches the location specified by this remote operator trigger over this period of time.

However, the remote computer system can cooperate with an autonomous vehicle in any other way to selectively and intermittently enable manual control of the autonomous vehicle by a remote operator as the autonomous vehicle approaches and navigates past a remote operator trigger location defined in a navigation map.

In one variation, the remote computer system (or autonomous vehicles in the fleet) can aggregate: sensor data (e.g., camera, LIDAR, and telemetry data) recorded by autonomous vehicles when approaching, entering, and passing locations or road segments specified by remote operator triggers; remote operator commands returned to these autonomous vehicles while responding to autonomous vehicle requests for manual assistance; and results of execution of these commands by these autonomous vehicles (e.g., whether an autonomous vehicle collided with another object, proximity of other objects to the autonomous vehicle during execution of navigational commands received from a remote operator). The remote computer system can then implement deep learning, artificial intelligence, regression, and/or other methods and techniques to refine an autonomous navigation model based on these data. In particular, the remote computer system can implement deep learning, artificial intelligence, or similar techniques to retrain an autonomous navigation (or "path planning") model based on sensor data, remote operator commands, and navigation results recorded near locations of remote operator triggers. For example, the autonomous vehicle can retrain the autonomous navigation model to elect a navigational action, an autonomous vehicle trajectory, and/or autonomous vehicle actuator positions more rapidly and/or more accurately at these remote operator trigger locations based on scene and autonomous vehicle characteristics near these locations and navigational commands issued by remote operators when guiding these autonomous vehicles through these remote operator trigger locations. The remote computer system can then push this retrained (or "updated," "revised") autonomous navigation model to deployed autonomous vehicles, which can then implement this autonomous navigation model when operating autonomously, thereby reducing need for remote operators to manually assist these autonomous vehicles near remote operator trigger locations.

For example, as the remote computer system updates the autonomous navigation model as described above and pushes updated autonomous navigation models to deployed autonomous vehicles over time, the remote computer system can transition remote operator triggers from full remote manual control to binary control—as described above—given that autonomous vehicles executing updated autonomous navigation models may be increasingly better suited to quickly and accurately select next navigational actions when approaching these remote operator trigger locations. By thus transitioning these remote operator triggers from full remote manual control to binary control, the remote computer system can reduce involvement and resource load of remote operators tasked with remotely assisting these autonomous vehicles over time.

Therefore, the remote computer system can: record a corpus of sensor data received from an autonomous vehicle following a request for manual assistance as the autonomous vehicle approaches a remote operator trigger location; record a navigational command entered by a remote operator assigned to this autonomous vehicle and served to the autonomous vehicle responsive to this request for manual assistance; generate a revised autonomous navigation model based on this corpus of sensor data and the navigational command; and load this revised autonomous navigation model onto the autonomous vehicle—and other autonomous vehicles in the fleet.

The remote computer systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a human annotator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the presently disclosed technology without departing from the scope of this presently disclosed technology as defined in the following claims.

What is claimed is:

1. One or more tangible non-transitory computer-readable storage media storing computer-executable instructions for performing a computer process on a computing system, the computer process comprising:
   navigating an autonomous vehicle along a route within a geographical region, the autonomous vehicle being controlled in an autonomous mode;
   detecting a trigger associated with a segment of the route based on a location of the segment of the route in a navigation map for the geographical region, the trigger corresponding to a transition from autonomous control to manual control determined based on a prior transition for at least one of a plurality of autonomous vehicles operating within the geographical region; and
   transitioning control of the autonomous vehicle from the autonomous mode to a manual mode based on the trigger associated with the segment of the route.

2. The one or more tangible non-transitory computer-readable storage media of claim 1, wherein the trigger is associated with the location of the segment based on a frequency of occurrences of transitions from autonomous control to manual control of the plurality of autonomous vehicles.

3. The one or more tangible non-transitory computer-readable storage media of claim 1, wherein the trigger is associated with the location of the segment based on a local condition corresponding to the segment.

4. The one or more tangible non-transitory computer-readable storage media of claim 3, wherein the local condition includes a location type.

5. The one or more tangible non-transitory computer-readable storage media of claim 4, wherein the location type includes at least one of: a school zone, a five-way intersection, a railroad crossing, an area having a crowd of pedestrians, an obstacle, or an unprotected turn.

6. The one or more tangible non-transitory computer-readable storage media of claim 3, wherein the local condition includes a sensor obscuration.

7. The one or more tangible non-transitory computer-readable storage media of claim 6, wherein the sensor obscuration corresponds to light conditions.

8. The one or more tangible non-transitory computer-readable storage media of claim 3, wherein the local condition includes at least one of road characteristics, weather conditions, or light conditions.

9. The one or more tangible non-transitory computer-readable storage media of claim 1, wherein the trigger is associated with the location of the segment based on a time of day.

10. The one or more tangible non-transitory computer-readable storage media of claim 1, wherein the prior transition for the at least one of the plurality of autonomous vehicles operating within the geographical region is determined based on driving records for the plurality of autonomous vehicles operating within the geographical region.

11. A method comprising:
    navigating an autonomous vehicle along a route within a geographical region, the autonomous vehicle being controlled in an autonomous mode;
    detecting a trigger associated with a segment of the route based on a location of the segment of the route in a navigation map for the geographical region, the trigger corresponding to a transition from autonomous control to manual control determined based on a prior transition for at least one of a plurality of autonomous vehicles operating within the geographical region; and
    transitioning control of the autonomous vehicle from the autonomous mode to a manual mode based on the trigger associated with the segment of the route.

12. The method of claim 11, wherein the trigger is associated with the location of the segment based on a frequency of occurrences of transitions from autonomous control to manual control of the plurality of autonomous vehicles.

13. The method of claim 11, wherein the trigger is associated with the location of the segment based on a local condition corresponding to the segment.

14. The method of claim 13, wherein the local condition includes a location type.

15. The method of claim 14, wherein the location type includes at least one of: a school zone, a five-way intersection, a railroad crossing, an area having a crowd of pedestrians, an obstacle, or an unprotected turn.

16. The method of claim 13, wherein the local condition includes a sensor obscuration.

17. The method of claim 16, wherein the sensor obscuration corresponds to light conditions.

18. The method of claim 13, wherein the local condition includes at least one of road characteristics, weather conditions, or light conditions.

19. The method of claim 11, wherein the trigger is associated with the location of the segment based on a time of day.

20. A system comprising:
    at least one processor configured to:
    navigate an autonomous vehicle along a route within a geographical region, the autonomous vehicle being controlled in an autonomous mode;
    detect a trigger associated with a segment of the route based on a location of the segment of the route in a navigation map for the geographical region, the trigger corresponding to a transition from autonomous control to manual control determined based on a prior transition for at least one of a plurality of autonomous vehicles operating within the geographical region; and
    transition control of the autonomous vehicle from the autonomous mode to a manual mode based on the trigger associated with the segment of the route.

* * * * *